United States Patent [19]

Morstad

[11] Patent Number: 5,141,301
[45] Date of Patent: Aug. 25, 1992

[54] SOFT BIFOCAL CONTACT LENS

[76] Inventor: David P. Morstad, 906 20th St., N.W., Minot, N. Dak. 58701

[21] Appl. No.: 691,441

[22] Filed: Apr. 25, 1991

[51] Int. Cl.$^5$ .............................................. G02C 7/04
[52] U.S. Cl. .............................. 351/161; 351/160 H
[58] Field of Search .............. 351/160 R, 160 H, 161, 351/162

[56] References Cited

U.S. PATENT DOCUMENTS

| | | | |
|---|---|---|---|
| 3,279,878 | 10/1966 | Long | 351/161 |
| 3,300,909 | 1/1967 | Cooper et al. | 51/284 |
| 3,472,581 | 10/1969 | Bronstein | 351/161 |
| 3,485,556 | 12/1969 | Naujokas | 351/169 |
| 3,684,357 | 8/1972 | Tsuetaki | 351/161 |
| 4,174,156 | 11/1979 | Glorieux | 351/168 |
| 4,199,231 | 4/1980 | Evans | 351/160 |
| 4,324,461 | 4/1982 | Salvatori | 351/160 |
| 4,418,991 | 12/1983 | Breger | 351/161 |

OTHER PUBLICATIONS

Green, M.; "Preliminary Report on a New Bifocal Contact Lens"; *Contacto*; vol. 5, No. 3; Mar. 1961; pp. 83,84,86-89.

Pacific Contact Lab. Inc.; *The Optical Journal & Review of Optometry*; Mar. 15, 1961; p. 72.

*Primary Examiner*—Scott J. Sugarman
*Attorney, Agent, or Firm*—Zarley, McKee, Thomte, Voorhees & Sease

[57] ABSTRACT

A translational soft multi-focal contact lens includes a near-vision portion located in the upper approximate one-third of the optical zone of the lens. A thin, upper portion is formed by a base-down prism in the contact lens which is pushed by the upper eyelid to move the lens downwardly in relation to the cornea, with the thickest part of the lens below the upper lid to assist downward movement, as the lower lid moves down. It also translates down in upward gaze, and laterally and down in sidewards and downward gaze.

5 Claims, 1 Drawing Sheet

SOFT BIFOCAL CONTACT LENS

TECHNICAL FIELD OF THE INVENTION

This invention relates generally to contact lenses, and more particularly to soft contact lenses having more than one focal length.

BACKGROUND OF THE INVENTION

Contact lenses have been utilized for many years for the correction of various visual disorders. However, soft contact lenses which were developed and have been fitted since 1971, and which now have approximately 90% of the contact lens market, have been less than successful in the treatment of presbyopia. Presbyopia is characterized by loss of elasticity of the crystalline lens, and hence, loss of the ability of the eye to adjust to clearly see objects which are close and also those which are more distant.

Three common methods for correcting presbyopia are the use of bifocal eyeglass lenses, bifocal contact lenses, and monovision contact lens fitting. (One eye has a distance lens, the other is fitted for near-vision). Eyeglass lenses generally have two portions ground for two viewing distances. Since the eye will move in relation to the eyeglass lens, the patient can easily view through either lens; by gazing straight ahead for distance viewing, or looking down for near viewing.

Another method utilizes bifocal contact lenses. One type of bifocal contact lens is quite similar to eyeglasses in that it moves relative to the eye in order to place the correct portion of the lens over the pupil for viewing. These contact lenses have a lower segment for reading, which is engaged by the lower lid when the patient looks down and the eye rotates downwardly, causing the lens to move upwards on the cornea onto the visual axis for near viewing. These lower segments can be either lathed, fused, or molded and these lenses have a base-down prism in them to orient the lens on the cornea so that the reading segment is on the lower part of the cornea when looking straight ahead for distance viewing.

To eliminate the ned for the base-down prism, other types of bifocal contact lenses have been developed — such as the concentric and aspheric designs.

In 1961, Morris Green, M.D., Pacific Contact Laboratories, Los Angeles, Calif., in an ad in the Mar. 15, 1961, copy of *The Optical Journal and Review of Optometry* described a hard bifocal contact lens with a bifocal in the upper part of the lens, that decentered down with blinking. The dynamics of the eyelid on hard contact lenses are much different than for soft contact lenses, since the hard contact lens sits on a coat of tears on the cornea and rests only slightly under the upper lid and near the lower lid edge. Thus, it does not conform to the cornea, limbus, and sclera as a soft contact lens does. Furthermore, the soft contact lens area is approximately 2 to 3 times larger and fits largely under both lids.

Present day hard (or rigid) bifocal contact lenses are designed with the bifocal in the lower portion of the lens with a base down prism for orientation. Such contact lenses have a thick lower edge that engages the lower lid and moves the lens up in downward gaze for clear near vision. These lenses are up to 90% successful.

Soft contact lenses were introduced in the early 1970's. Present day soft bifocal contact lenses designed with a lower bifocal segment and base down prism are not effective because the size of the lens puts the lower edge under the lower eye lid, making it very difficult to move the lens up. It is therefore a general object of the present invention to provide an improved soft multi-focal lens by increasing the amount and direction of movement of the reading portion to move over the pupil and into the visual axis by moving in a downward direction, and also increasing the "near vision" function of the lens.

Another object of the present invention is to provide an improved soft multi-focal contact lens.

Yet another object is to provide a soft multi-focal contact lens which is economical to manufacture, and more successfully fit by the practitioner.

These and other objects will be apparent to those skilled in the art.

SUMMARY OF THE INVENTION

The improved soft multi-focal contact lens of this invention includes a distance-vision portion and a near-vision portion, each having a focal length to correct the wearer's vision at the associated distance. The near-vision portion is located in the upper and side parts of the optical zone of the lens. In a concentric bifocal contact lens the circular design is of equal reading segment size all around the distance viewing portion. The improvement is in an eccentric positioning of the circle, creating a much larger reading portion in the upper part of the lens, with areas on both sides of the distance portion, and no reading portion in the lower viewing section of the optical zone. A further improvement is the use of a base-down prism with the reading portion situated in the upper and side portions of the optical zone of a soft bifocal contact lens designed to move down.

Investigation of lid movements and their effect on movement of a soft contact lens are very instructive. One criterion for determining a good fit in a standard soft single vision contact lens is to have the patient look up. If the lens moves straight down with such an upward gaze, then it is considered a good fitting lens.

The upper portion of a lens is thinner with the use of a base-down prism, so that by looking downward the upper lid will push and squeeze the lens downward. The heavier weight in the lower part of the lens also moves the lens down because of the force of gravity. For distance viewing, the lens is held in place by its insertion under the upper lid, the draping on the eye, and its adherence to the upper lid, the cornea, limbus and sclera.

DESCRIPTION OF THE PREFERRED EMBODIMENT

The applicant herein has made extensive observations of eyelid movements while experimenting with various forms of multi-focal contact lenses, such as disclosed in his U.S. Pat. No. 4,702,573. During these observations, the applicant found that the main problem with prior art translation type soft contact lenses, was in the difficulty in causing the lens to move upwardly in relation to the cornea. These prior art soft lenses utilized a near-vision portion located in the lower half of the contact lens. It was thereby intended for the lower lens area to abut the lower eyelid as the eye was rotated downwardly in order to view through the near-vision portion of the lens.

During the applicant's extensive observation of lid movements, he noted downward movement of the upper lid during downward movement of the eye was much greater than the rotational downward movement of the eye. This movement could range from 2-5 mm further onto the cornea. In Wolff's *Anatomy of the Eye and Orbit*, it is stated that the upper eyelid is the more movable of the two eyelids. When the eyes are open and looking straight ahead, it just covers the upper part of the cornea; when they are closed they cover the whole. The lower lid, on the other hand, is just free of the cornea when the eye is open. It was also noted that the lower eyelid would move slightly downwardly during the same downward rotational movement of the eye. Wolff also notes that the inferior rectus makes the eye look down and in, and also wheel rotates it outward (extortion). By means of its fascial expansion it also depresses the lower lid.

In Duane's *Clinical Ophthalmology*, Vol. V, Chapter 5, the biomechanics of eyelid movements are described. Duane states that interlid pull from the retractor muscle in the opposing eyelid causes the eyelid to follow in gaze movements. That is, in downward gaze, if the upper lid moves down, so does the lower. This led the inventor to the conclusion that the soft contact lens should be designed to move downwardly on the eye, rather than upwardly as is found in the prior art. Further conclusions on downward soft contact lens movement will be drawn from these anatomical facts.

Figure 1:
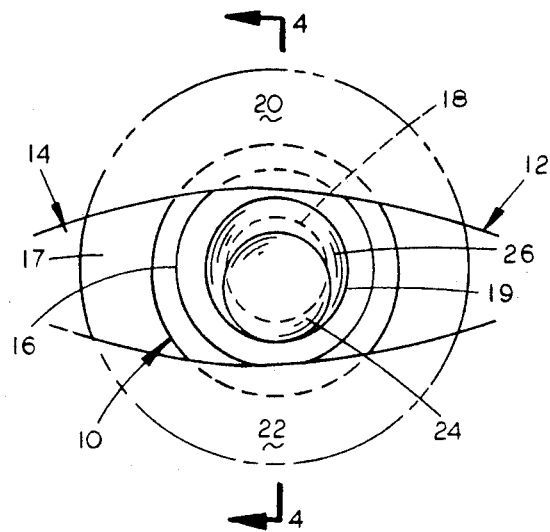
FIG. 1 is a front elevational view of the lens of this invention located on an eye which is focused straight ahead.

Referring now to the drawings, in which identical or corresponding parts are given the same reference numeral, and more particularly to FIG. 1, the improved contact lens of this invention is designated generally at 10. The palpebral fissure (lid opening) narrows and then ends both nasally and temporally, indicated generally at 12 and 14, respectively. A soft bifocal contact lens will move off center towards the nasal 12 or the temporal 14 areas when looking left or right, positioning the side reading portion of the lens onto the pupil giving the patient near vision looking laterally and downward.

A soft toric (astigmatic) contact lens with a base-down prism will position straight up and down (at the 90° position) or can rotate slightly clockwise or counter-clockwise. With the reading portions on both sides of the distance viewing area, the reading part will be more effective in either rotation in a soft bifocal contact lens with a base-down prism.

Figure 2:
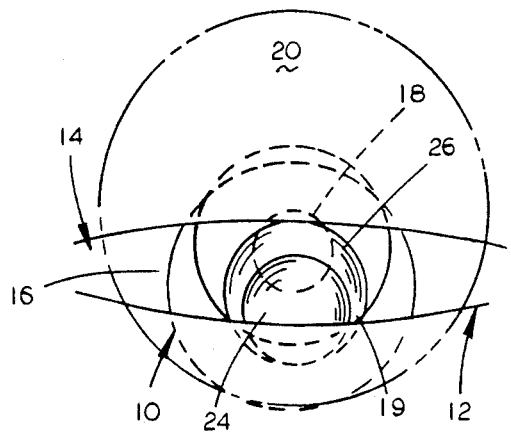
FIG. 2 is a front elevational view of the lens on an eye which is directed downwardly.
Figure 3:
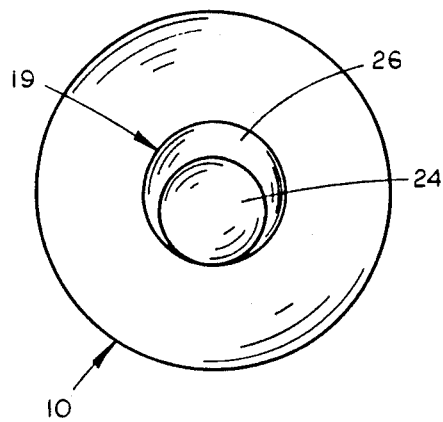
FIG. 3 is an enlarged front elevational view of the lens of the present invention.

In FIGS. 1 and 2, the contact lens 10 of this invention is shown positioned on the cornea 16 and sclera 17 of an eye. The pupil is indicated in hidden lines at 18 and represents that portion of the optical zone 19 of lens 10 through which the person will be viewing. An upper eyelid 20 and lower eyelid 22 are shown in their general positions according to the positioning of the eyeball, in FIGS. 1 and 2.

Figure 4:
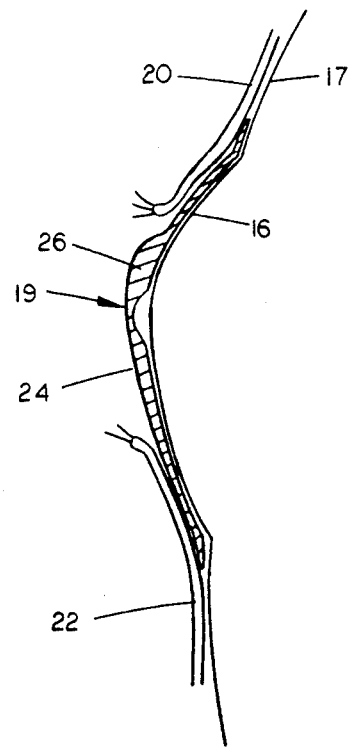
FIG. 4 is a sectional view of the invention taken at lines 4—4 in FIG. 1.

Referring now to FIG. 4, a vertical sectional view through the eye shows contact lens 10, which will follow the general curvature of the cornea 16 of the eye. The anterior and posterior surfaces of optical zone are shaped for the appropriate correction of the user's sight. The lens 10 is composed of soft ophthalmic material and includes a general distance-vision portion 24. The near-vision portion 26 of the lens is located in the upper portion of the optical zone of the lens, as shown in the drawings. While a line is shown separating distance correcting portion 24 and near-vision portion 26 in the figures, this is merely for clarity in describing the invention. Bifocal lenses are currently known and available wherein the near-vision and distance-vision portions of the lens are blended or aspheric.

Because the lower part of the optical zone of the lens has only a distance-vision portion, it gives the user a clear lower field; utilized in going up and down stairs and the like. This gives wearers much more confidence and mobility.

The contact lens 10 grows thinner from the lower edge towards the upper, superior edge, due to the base down prism. As the upper lid 20 moves down, it pushes and squeezes the lens 10 downward. The convexity of the reading portion also assists in helping the upper lid move the lens in a downward direction. The prior art with the bifocal in the lower part of the lens assumed a thinner lens at the top would ease movement of the lens upward under the upper lid and thus, make the soft contact lens move up. However, the inventor has found that a thinner upper portion actually enhances the ability of the upper lid 20 to squeeze the lens 10 between the upper lid and the cornea 16 forcing the lens down. At the same time, the lower lid will move slightly downward (1-2 mm) and the thicker portion of the lens will be under the lower lid and help pull lens 10 down with near-vision portion 26 centered over pupil 18 (see FIG. 2).

As noted above, the upper eyelid 20 exerts more pressure on the soft contact lens than the lower lid, as is evidenced by the fact that ectropion is found in the lower lid but not in the upper lid, and as Wolff points out, the upper tarsal plate, which gives rigidity to the lids, is much larger than the lower tarsal plate. As the lowered upper lid moves further downward on the cornea, where a much larger area of the cornea is covered, the upper lid fits even tighter so as to squeeze and push the soft contact lens downwardly with respect to the cornea, thereby aligning the near-vision portion with the pupil.

The effect of gravity will also assist in pulling the contact lenses downward. It will pull the upper lid 20 more firmly against the eye and also move the lower lid 22 downward and away from the eye. In *Clinical Opthamology*, Vol. I, Chap. 54, it states that the physical action of the upper lid along with gravity will cause differently powered lenses to position and move differently. Placing a base-down prism on the lens destabilizes the centering and increases the effect of gravity on the downward movement of a soft lens.

In the prior art, a base-down prism was used for orientation of the segment downward. To eliminate the use of prisms for orientation downward, other bifocal variations were used such as the concentric bifocal, and aspheric lens. The concentric lenses do not move on the eye enough to be effective. By adding the base-down prism, which they sought to avoid, the centering will be destabilized, the thinner edge at the top of the lens will help the upper lid push and squeeze the lens down, as will gravity, thereby considerably enhancing the effectiveness of the concentric lens. Whereas the invention has been described in connection with the preferred embodiment thereof, it will be understood that many modifications, substitutions and additions may be made which are within the broad scope of the appended claims. For example, the contact lens may be produced in any of the various shapes and types required for sight correction. Likewise, the materials used in making the lens and the exact dimensions of the corrective portions may be varied depending upon the user's needs.

Thus, there has been described an improved translational multi-focal soft contact lens which accomplishes at least all of the above stated objectives.

I claim:

1. A soft multi-focal contact lens adapted for translational movement by the upper and lower eyelids, downward and sideward across the cornea of an eye, comprising:

a generally disc-shaped soft lens having a diameter greater than the cornea of an eye, an anterior surface and a posterior surface, the posterior surface being adapted to conform to the entire surface of the cornea limbus, part of the sclera of any eye, the lens having a diameter sufficient to extend partially under both the upper and lower eyelids;

said lens having a generally circular optical zone with a lower, distance-vision portion, and a near-vision portion above and to the sides of the distance-vision portion;

said lens having a base down prism forming an upper thinner portion and thicker lower portion of said contact lens, which is adapted to cooperate with the upper eyelid of the eye to provide a surface against which the upper eyelid will push the contact lens downwardly with respect to the cornea, and facilitate the lower lid in moving the lens down.

2. The soft contact lens of claim 1, wherein said distance-vision portion is circular and wherein said near-vision portion is generally crescent-shaped in front elevation.

3. The soft contact lens of claim 1, wherein the lower edge of said lens is beveled to facilitate downward translational movement of said lens between the lower eyelid and the eye.

4. The soft contact lens of claim 1, wherein said near-vision portion of said lens has a progressively thicker vertical cross-section, to vary focal distances.

5. The soft contact lens of claim 1, wherein said posterior surface has a toric portion to correct astigmatism.

* * * * *